UNITED STATES PATENT OFFICE.

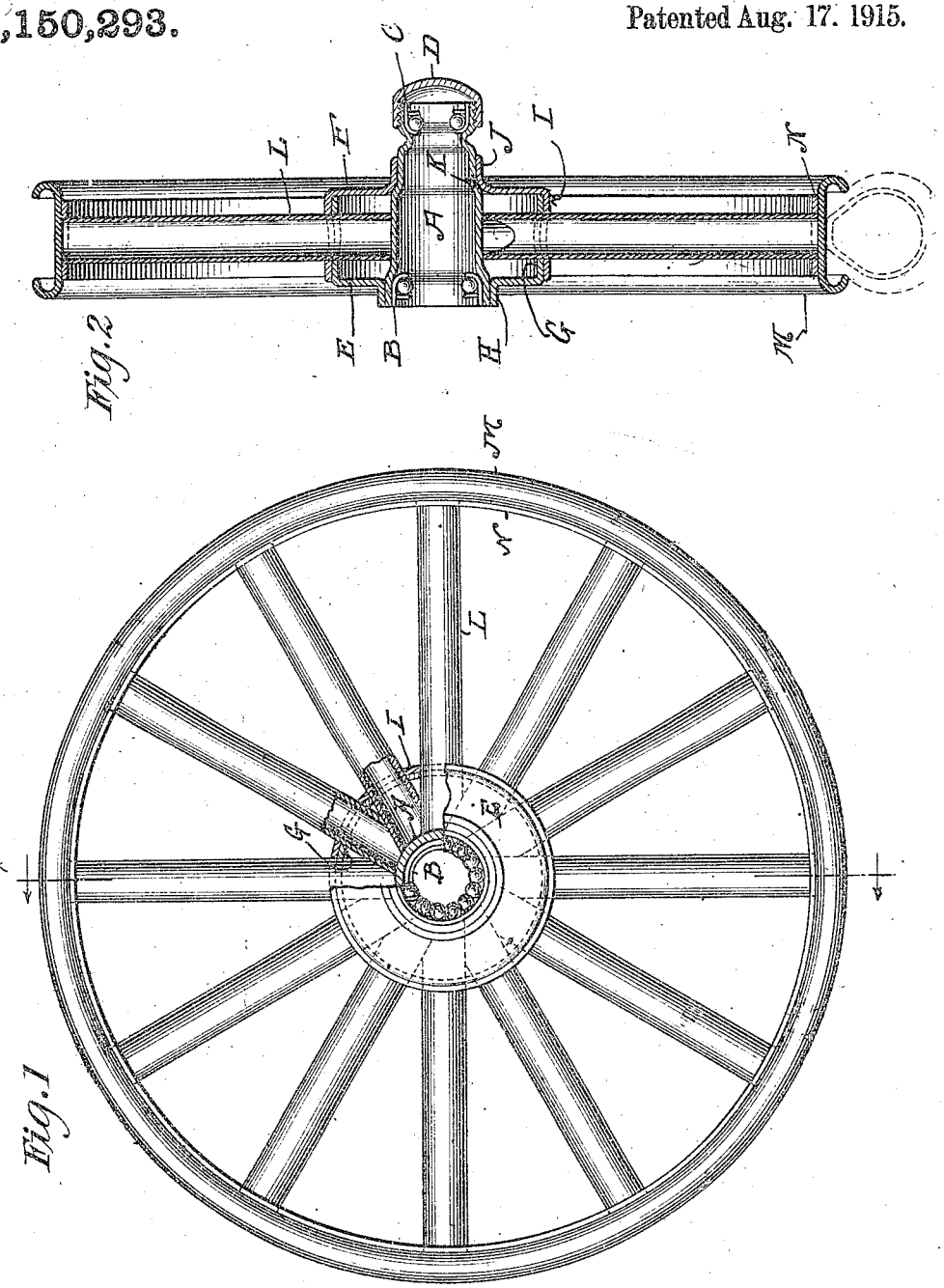

THOMAS E. MURRAY, OF NEW YORK, N. Y.

VEHICLE-WHEEL.

1,150,293.

Specification of Letters Patent.

Patented Aug. 17, 1915.

Application filed April 29, 1914. Serial No. 835,062.

*To all whom it may concern:*

Be it known that I, THOMAS E. MURRAY, a citizen of the United States, residing at New York, in the county of New York and State of New York, have invented a certain new and useful Improvement in Vehicle-Wheels, of which the following is a specification.

The invention is a vehicle wheel, intended more especially for automobiles.

The invention consists in the construction hereinafter set forth, whereby the wheel may be made of sheet metal, preferably steel, drawn, spun or otherwise formed by simple mechanical operations, and so that the parts may be united by welding.

In the accompanying drawings—Figure 1 is an elevation, and Fig. 2 a section of my wheel on the line $x, x$ of Fig. 1.

Similar letters of reference indicate like parts.

The tubular hub A is shouldered internally at its ends to receive the circular runways of the axle ball bearings B and C. The outer end of the hub is preferably of smaller diameter than the inner end, and is threaded to receive the steel cap D. On the hub are two annular disks E, F. The disk E has a flange G on its outer edge and an oppositely turned flange H on its inner edge, the flange H fitting upon the enlarged inner end of the hub. The disk F has a flange I on its outer edge which receives flange G of disk E, and a flange J on its inner edge which abuts against a shoulder K on a contracted portion of the hub near the outer end thereof. In the flanges G and I are registering openings to receive the tubular spokes L, the inner ends of which meet the hub. The two flanged disks unitedly form an annular hollow flange upon and surrounding the hub. The outer ends of the spokes meet the outer wheel rim M and are received in an inner rim N on the inner periphery of said outer rim. The channel in the rim is to be constructed to receive a tire, indicated by dotted lines, Fig. 2, in the usual way.

The hub A, flanged disks E, F and spokes L are all made preferably of steel tubing, and the spokes may be homogeneously united, if desired, at all three points, to hub, flange and rim. The rim may be heated before being placed upon the spokes so as to shrink on cooling and form close joints. Where the tubular spokes are of such diameter as to require it, a portion of their walls at their inner ends may be cut away, as shown in Fig. 1, in order to permit said inner ends to bear upon the hub. The joints between the spokes may also, if desired, be homogeneously united. By reason of this construction, I produce a wheel of great strength and lightness, and containing very few parts, all of which may be made of sheet steel or steel tubing by drawing, spinning or similar simple mechanical operations, and in such shapes as that they can be easily united by welding and without bolts or other extraneous fastenings.

I claim:

1. A vehicle wheel formed of sheet metal, comprising an integrally formed tubular hub of diameter decreasing from one end to the other, an annular hollow flange on said hub having in its sides central apertures of different diameters receiving said hub, and spoke openings in its circumferential wall, a rim, and tubular spokes; the said spokes passing through said openings in said flange wall and being welded at their butt ends to said hub and said rim.

2. A vehicle wheel formed of sheet metal, comprising a rim, a tubular hub, an annular hollow flange receiving said hub in its central openings and directly secured to the outer periphery of said hub, and tubular spokes disposed in butt contact with said hub and said rim and passing through openings in the circumferential wall of said flange: the joints between said parts being homogeneously united.

3. A vehicle wheel formed of sheet metal, comprising a tubular hub, two annular disks having integral overlapping flanges on their circumferential edges provided with registering spoke openings and fitting upon said hub, a rim, and tubular spokes united to said hub and said rim and passing through said openings in said disk flanges.

4. A vehicle wheel formed of sheet metal, comprising a tubular hub, internally formed with shoulders near its ends, ball bearing runways in said hub and abutting on said shoulders, two annular disks having integral overlapping flanges on their circumferential edges provided with registering spoke openings, and on their inner edges integral flanges fitting upon said hub, a rim, and tubular spokes united to said hub and said rim and passing through said openings in said disk flanges.

5. A vehicle wheel formed of sheet metal, comprising a hub, a rim, and spokes; the said spokes having their extremities in butt contact with said hub and said rim and being homogeneously united to said hub and rim at said butt contact joints.

6. A vehicle wheel formed of sheet metal, comprising a hub, a rim, an annular hollow flange on said hub encircling the same and secured thereto at its inner periphery and having spoke openings in its circumferential wall, and spokes extending through said openings and bearing at their opposite ends on said hub and said rim; each of said spokes having a portion of its wall at its inner end cut away to receive the next adjacent spoke.

In testimony whereof I have affixed my signature in presence of two witnesses.

THOMAS E. MURRAY.

Witnesses:
GERTRUDE T. PORTER,
MAY T. MCGARRY.